United States Patent [19]

Frailly

[11] 4,023,224
[45] May 17, 1977

[54] METHOD FOR PRODUCING SELF-LOCKING FASTENERS

[75] Inventor: Robert A. Frailly, Massillon, Ohio

[73] Assignee: Eaton Corporation, Cleveland, Ohio

[22] Filed: Aug. 28, 1975

[21] Appl. No.: 608,804

Related U.S. Application Data

[63] Continuation of Ser. No. 458,370, April 5, 1974, abandoned.

[52] U.S. Cl. .............................. 10/10 P; 10/27 H
[51] Int. Cl.² ....................................... B23G 9/00
[58] Field of Search ............ 10/10 R, 10 P, 27 R, 10/27 H; 85/1 C; 148/147; 151/14 R, 14.5

[56] References Cited

UNITED STATES PATENTS

| | | | |
|---|---|---|---|
| 2,229,565 | 1/1941 | Hallowell | 85/1 C |
| 3,818,525 | 6/1974 | Bedi | 10/27 R |
| 3,831,213 | 8/1974 | Bedi | 10/10 P |
| 3,914,178 | 10/1975 | Fineran et al. | 151/14 R X |

FOREIGN PATENTS OR APPLICATIONS

| | | | |
|---|---|---|---|
| 1,117,017 | 1/1955 | France | 10/27 H |
| 311,337 | 8/1930 | United Kingdom | 10/27 H |
| 811,573 | 4/1959 | United Kingdom | 85/1 C |

*Primary Examiner*—E. M. Combs
*Attorney, Agent, or Firm*—Teagno & Toddy

[57] ABSTRACT

An improved method for producing a threaded, metallic, self-locking fastener having a metallic patch flame sprayed thereon. The improved method includes a heat-treating operation which densifies and smooths the outer surface of the patch while not substantially affecting the porosity or resiliency of the patch and improves the bond between the patch and the base fastener.

8 Claims, 5 Drawing Figures

U.S. Patent May 17, 1977 Sheet 1 of 2 4,023,224
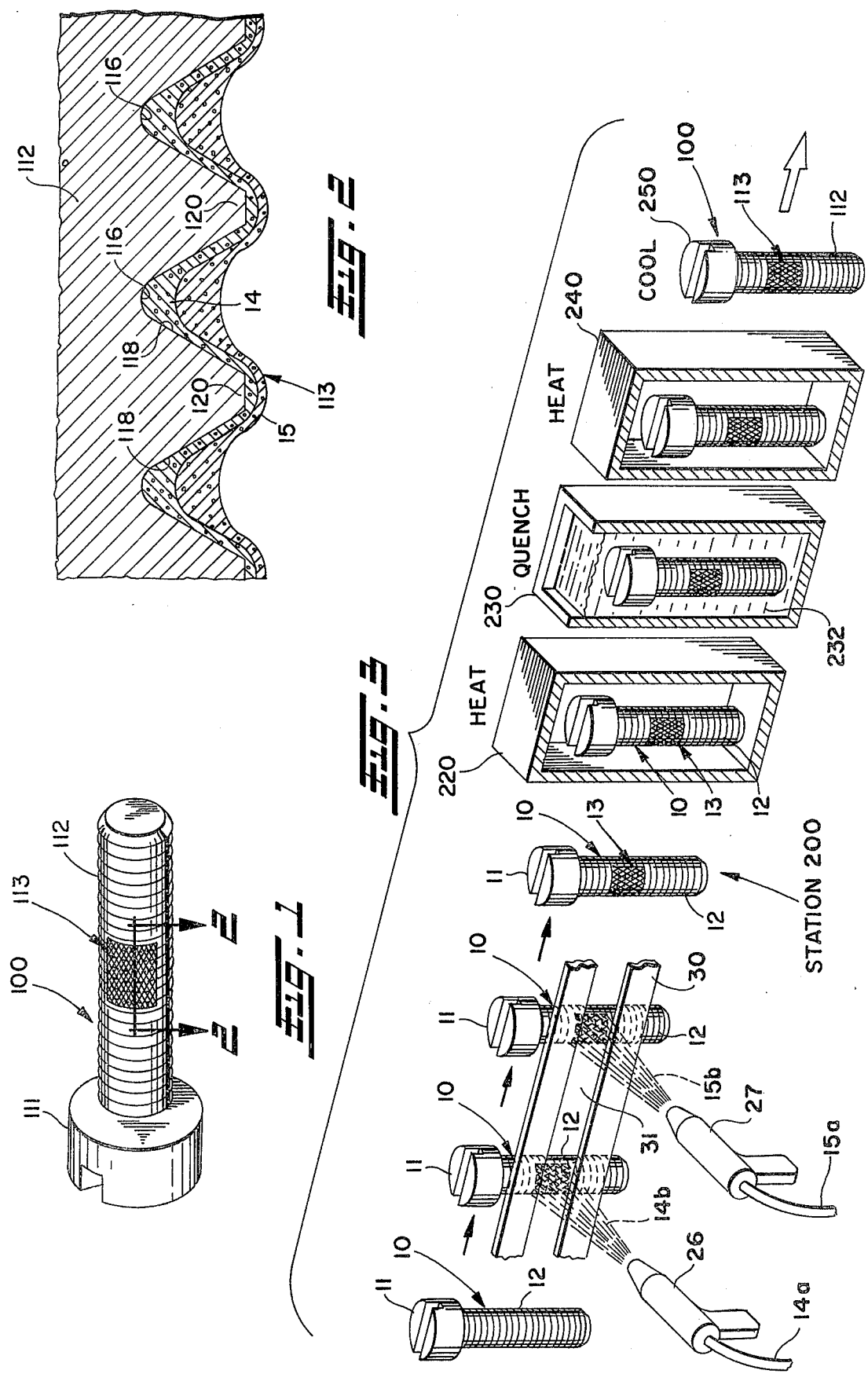

METHOD FOR PRODUCING SELF-LOCKING FASTENERS

This is a continuation of application Ser. No. 458,370, filed Apr. 5, 1974 now abandoned.

BACKGROUND OF THE INVENTION

1. Field of the Invention

This invention relates to methods for producing self-locking fasteners and more particularly relates to improved methods for producing metallic self-locking fasteners having a metallic patch flame sprayed thereon.

2. Description of the Prior Art

Methods for producing threaded metallic self-locking fasteners having a metallic patch flame sprayed thereon are known in the prior art and may be seen by reference to U.S. Pat. No. 3,818,525, and U.S. Pat. No. 3,831,213, both assigned to the assignee of this invention. In both of these patents, a threaded, metallic, reusable, self-locking, fastener is produced by spraying at least one molten metallic material over a selected portion of a threaded fastener to produce a metallic patch having a circumferential extension of less than 360° and being thicker in the thread valleys than on the adjacent thread crests. Such patches have proven to be relatively porous and resilient and have provided self-locking fasteners having excellent locking and reusability characteristics. However, in some situations, the above mentioned methods have not been totally satisfactory as the bond between the patch and the threaded fastener was occasionally weaker than desired and also the porous outer surface of the path occasionally caused a higher than desired frictional contact with mating threaded fasteners causing the initial installation torque required to threadably engage the self-locking fastener with a mating threaded fastener to be higher than desired and/or required. Also, if the patch were to be sprayed onto a previously heat treated threaded fastener additional preparatory steps such as grit blasting, dry air blasting, pre-heating and/or sizing might be required.

SUMMARY OF THE INVENTION

In accordance with the improved method of the present invention, the drawbacks of the prior art methods have been overcome to the extent that a relatively economical method for producing threaded, metallic, self-locking fasteners having relatively porous, resilient patches without unduly high initial installation torque requirements is provided. The above is accomplished by providing a "green" or metallic fastener which has not been heat treated and which is then subject to the spray of at least one molten metallic material having a modulus of elasticity lower than that of the fastener to produce a patch which is relatively porous and resilient and which is thicker in the thread valleys than on the adjacent thread crests. The fastener is then subject to a heat treating operation which both heat treats the fastener and densifies and smooths the outer surface of the patch. The heat treating process also has a sintering effect which improves the bond between the patch and the base fastener. It is noted the term "densify" is used to mean increase of density.

Accordingly, it is an object of the present invention to provide a new and improved method for producing self-locking fasteners.

A further object of the present invention is to provide a new and improved method for producing reusable, metallic, threaded, self-locking fasteners having a relatively porous and resilient flame sprayed metallic patch effectively bonded thereon which is thicker in the thread valleys than on the adjacent thread crests and which has a relatively smooth outer surface.

These and other objects and advantages of the present invention will become apparent from a reading of the following detailed description of the invention taken in connection with the accompanying drawings.

BRIEF DESCRIPTION OF THE DRAWINGS

FIG. 1 is a front perspective view of a metallic, self-locking, threaded fastener produced according to the improved method of the disclosure.

FIG. 2 is an enlarged fragmentary view in longitudinal section taken along line 2—2 of FIG. 1.

FIG. 3 is a perspective view illustrating the improved method of the disclosure.

DETAILED DESCRIPTION OF THE PREFERRED EMBODIMENT

Figure 4:
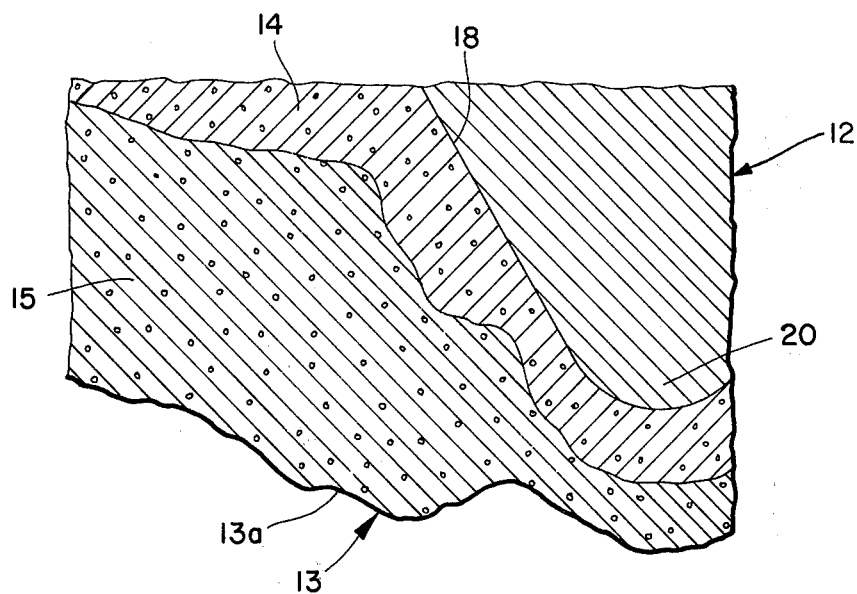
FIG. 4 is an enlarged cross section taken at 100 times actual size showing a portion of the patch of fasteners produced by the present invention as is seen before heat treating.

The reusable, metallic, self-locking, threaded fastener 100 produced by the novel method of this disclosure may be seen by reference to FIGS. 1 and 2. The fastener 100 includes a threaded portion 112, a headed portion 111 and a metallic patch 113 intended for self-locking interference with a complementary threaded member. It is understood that although the fastener 110 illustrated is an externally threaded fastener, or bolt, the method of this disclosure is equally applicable to internally threaded fasteners such as nuts or the like.

As is illustrated in FIG. 2, the metallic patch 113 is relatively spongy and porous and is thicker in the thread valleys 116 than on the adjacent thread crests 120. The advantages of this type of structure are discussed in allowed application Ser. No. 121,664 filed Mar. 8, 1971, and allowed application Ser. No. 287,206 filed Sept. 7, 1972, both of which are incorporated by reference and are assigned to the assignee of this application, and involve the relatively more resilient and lubricant retaining properties of a spongy, porous patch and also the support supplied by the bearing surfaces 118. The patch 113 may comprise a single metallic deposit as is illustrated in Ser. No. 121,664 or a composite deposit as is illustrated in FIG. 2 and in Ser. No. 287,206. In either case, the patch has at least one layer of deposited material 15 having a modulus of elasticity lower than that of the threaded portion 112 or the intended complementary threaded member. The illustrated composite patch 113 is located relative to the length of threaded portion 112 so that it will be elastically deformed between the threaded portion 112 and mating threads of a complementary element with which the bolt 110 is assembled to provide increased frictional resistance to undesired loosening of the threaded engagement between bolt 110 and the complementary element at a point diametrically opposite the patch 113. The material 14 of the underlayer is preferably similar to bolt 110. The material 15 of the overlayer or outerlayer is dissimilar to material 14 and has a lower modulus of elasticity than that of material 14.

The improved method of this disclosure is schematically illustrated in FIG. 3. A green or non-heat treated fastener such as bolt 10 having a threaded portion 12 and a headed portion 11 is supplied. The threaded portion 12 may be subject to a cleaning solvent, such as trichloroethylene or methyl ethyl ketone, to remove soluble oils and the like.

Following cleaning of fastener 10, a first metallic material 14 is applied to the cleaned portion in a first spraying operation. The first metallic material 14 is preferably a metal or metal alloy similar to and which may have a modulus of elasticity substantially the same as that of the material of the threaded portion of the fastener. Satisfactory results have been obtained by applying a metallic material such as carbon steel on a carbon steel fastener.

A second metallic material 15 is thereafter applied to the first metallic material 14 in a second spraying operation to produce a composite metallic patch 13. The second metallic material that is illustrated is a metal or metal alloy having a modulus of elasticity lower than that of the first metallic material. The resulting patch comprises an underlayer, adjacent the fastener, of the first metallic material, e.g., steel, and an overlayer of the second metallic material, e.g., copper alloy. Satisfactory results have been attained by using materials such as copper alloys for the second metallic material in application where a complementary, threaded, steel element is contemplated. It should be noted that the second material, or first material if only a single material patch is to be utilized, is chosen from a group of materials which are elastic materials and which will deform upon contact with the complementary threads. It is preferred to have the patch deform rather than the complementary threads.

As illustrated in FIG. 3, the spraying operation includes two flame spray guns 26 and 27. Bolts 10 are successively moved past the guns 26 and 27 by a suitable conveyor facility (not shown) with their longitudinal axis disposed normal to the spray from the guns and the direction of movement of the bolts. Metallic materials 14a and 15a is fed in wire form through spray guns 26 and 27, respectively, and is atomized by the guns to produce molten metallic sprays 14b and 15b. Spray guns 26 and 27 are positioned so that the molten metallic spray 15b is applied to bolt 10 immediately after the application of the molten metallic spray 14b. By so positioning the guns, the first material will be at a high temperature at the time the second material is applied. Application in this manner results in improved bonding between the materials 14 and 15. A mask 30 may be positioned between bolts 10 and guns 26 and 27. Mask 30 includes a longitudinal central aperture 31 which functions to channel molten metallic sprays 14b and 15b onto the selected arcuate area on threaded portions 12 of bolts 10. A composite metallic patch 13 is thereby formed on the surface of threaded portion 12 with the arcuate and axial extent of the patch being selectively predetermined by the configuration of opening 3 and the positioning of guns 26 and 27 and bolt 10.

Flame spray guns suitable for carrying out the method are commercially available, for example, from the Colmonoy Division of the Wall Colmonoy Corporation of Detroit, Michigan. The Colmonoy Wirespray Gun WG-550 has been found to be particularly well suited to the method.

In order to further illustrate the flame spray portion of the method and fastener produced thereby, the following example is provided.

EXAMPLE

A standard SAE-10-38 steel bolt was first cleaned with trichloroethylene to remove oils. Next, a Colmonoy Wirespray Gun WG-550 was used to apply a first metallic layer of steel to the threaded surface of the bolt. The steel was fed into the spray gun in wire form and exploded from the spray gun in a molten metallic particle spray which impinged upon the surface of the bolt forming a first layer of heterogeneous, spongy, porous metallic material bonded to the threaded surface. Immediately thereafter, in a similar manner, a second spray gun was used to apply a second metallic material of "Spraybronze C" over the first metallic layer to produce a composite metallic patch. "Spraybronze C" is a copper alloy consisting of 90% copper and 10% zinc. The alloy is available from Metco Inc. of Westbury, New York.

The mask 30 was placed about one inch from the adjacent surface of the bolt s threaded portion 12. Spray guns 26 and 27 were held with their tips between 3 to 5 inches from mask 30. The bolt was sprayed with the steel for about 5 seconds, forming a heterogeneous metallic layer (FIG. 2) having a spongy, porous constitution by virtue of the spraying operation. Immediately thereafter the bolt was sprayed with the "Spraybronze C" for about 2 seconds, forming a second homogeneous spongy, porous metallic layer (FIG. 2). It is noted that the patch thus formed is thicker in the thread valleys than on the adjacent thread crests.

At this point the fasteners 10 emerge from the spraying operation or operations in the conditions shown at station 200 in FIG. 3. The patch 13 at this stage of the method may be seen by reference to FIG. 4 which is an enlarged cross section (100X) of a portion of the patch 13 as sprayed. It is noted that the outer surface 13A of the patch 13 is rather rough and porous which may result in an undesirably high initial coefficient of friction between the fastener 10 and the complementary member which may result in an undesirably high initial torque to threadably engage fastener 10 and the complementary threaded member.

In accordance with the improved method of the present invention, the fasteners 10 are moved from station 200 to a heat treating operation. The heat treating operation typically comprises a heating station or furnace 220 whereat the fastener 10 is heated to a temperature in the range of 1450° – 1800° F, depending upon the materials utilized. The heated fasteners are then moved to a quench station 230 whereat they are submerged in a quenching fluid 232, such as oil, water or other liquids, wherein the temperature of the fasteners is reduced to a temperature in the range of 120° – 200° F. The quenched fasteners 10 are then reheated as at furnace 240 whereat they are brought to a temperature in the range of 400° – 1200° F and remain at that temperature for approximately ten minutes to six hours. The reheated fasteners 10 are then allowed to cool, preferably at room temperature, at cooling station 250.

Figure 5:
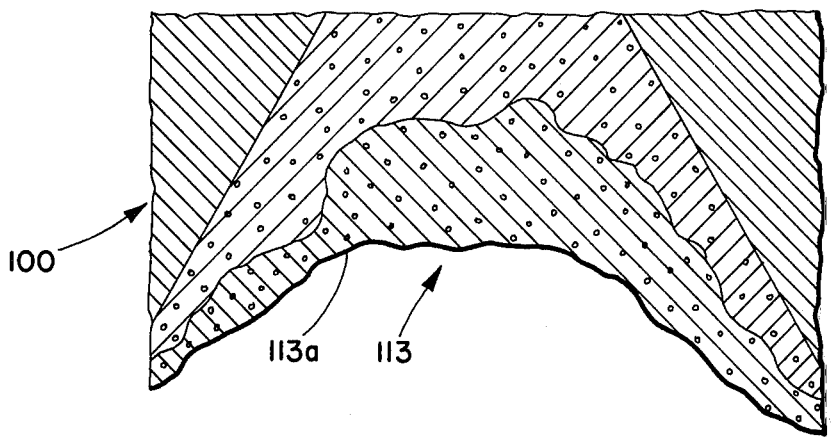
FIG. 5 is an enlarged cross section taken at 100 times actual size showing a portion of the patch of fasteners produced by the present invention as is seen after heat treating thereof.

The cooled fasteners 110 are completed and may be seen by reference to FIG. 5. FIG. 5 is an enlarged cross section (100X) of a portion of patch 113 after the heat treat operation. It may be seen that although the patch 113 is still relatively porous and spongy that the outer surface 113A is considerably more dense and smoother than surface 13A seen in FIG. 4.

In conclusion, by heat treating the metallic fasteners 10 after spraying rather than prior to spraying, a more desirable patch 113 may be obtained and the operations necessary to prepare a heat treated fastener for receipt of a flame sprayed patch have been eliminated.

Although the invention has been described with a certain degree of particularity, it is understood that the present description of the preferred form has been made by way of example only and that changes in the details of the disclosed method are possible within the scope and spirit of the invention as hereinafter claimed.

I claim:

1. A method for producing reusable, metallic, self-locking fasteners having an axially extending threaded portion for engagement with a complementary threaded member and a metallic patch bonded to the threaded portion for self-locking interference with the complementary threaded member, said patch being spongy and porous and thicker in the thread valleys than on the adjacent thread crests, the outer surface of said patch being smoother and of greater density than the remainder of the patch, said method comprising the steps of:
   A. providing a metallic fastener having an axially extending threaded portion prior to heat treatment thereof;
   B. providing at least one continuously spraying, flame spray gun for flame spraying a metallic material having a modulus of elasticity lower than that of said threaded portion;
   C. axially and rotationally controlling the position of said metallic fasteners while simultaneously moving each of said fasteners sequentially into the spray of said first flame spray gun to produce a spongy, porous deposit of said threaded portions having an effective circumferential extension of less than 360° of the circumference of the fastener, said deposit being substantially thicker in the thread valleys than on the adjacent crests;
   D. heating the fastener and the patch after the spraying step of (C);
   E. placing the heated fastener and patch into a quenching medium;
   F. reheating the fastener and patch; and
   G. allowing the fastener and patch to cool.

2. The method of claim 1 wherein the fastener and patch is heated to a temperature in the range of 1450° – 1800° F in operation (D), is cooled to a temperature in the range of 120° – 200° F in operation (E) and is reheated to a temperature in the range of 400° – 1200° F in operation (F).

3. An improved method for producing reusable, metallic, threaded self-locking fasteners having a patch of at least one metallic material of lower modulus of elasticity than that of the fastener flame sprayed thereon such that the patch is relatively spongy and porous and is thicker in the thread valleys than on the adjacent thread crests, the outer surface of said patch being smoother and of greater density than the remainder of the patch, including the steps of providing a threaded fastener and then spraying a molten metallic material on a selected circumferential and axial portion of the threads, the method improvement comprising:
   a. providing a threading fastener prior to heat treatment thereof; and
   heat treating the fastener after the patch has been flame sprayed thereon.

4. The improved method of claim 3 wherein the heat treating of step (a) comprises the following operations:
   c. heating the fastener and patch;
   d. placing the fastener and patch into a quenching medium;
   e. reheating the fastener and patch; and
   f. allowing the fastener and patch to cool to room temperature.

5. The improved method of claim 4 wherein the fastener and patch is heated to 1450° – 1800° F in operation (C), is cooled to 120° – 200° F in step (D) and is reheated to 400° – 1200° F in step (e).

6. The improved method of claim 5 wherein the quenching medium of step (d) is an oil based fluid.

7. The improved method of claim 5 wherein the quenching medium of step (d) consists essentially of water.

8. The improved method of claim 5 wherein fasteners are allowed to remain at a temperature in the range of 120° – 200° F in step (d) for a period in the range of 10 – 360 minutes.

* * * * *

UNITED STATES PATENT AND TRADEMARK OFFICE
CERTIFICATE OF CORRECTION

PATENT NO. : 4,023,224
DATED : May 17, 1977
INVENTOR(S) : Robert A. Frailly

It is certified that error appears in the above-identified patent and that said Letters Patent are hereby corrected as shown below:

Col, 1, line 34:  "path" should read "patch".

Col. 3, line 7:  The word "green" should be in quotes.

*Signed and Sealed this*

*second* Day of *August 1977*

[SEAL]

Attest:

RUTH C. MASON
*Attesting Officer*

C. MARSHALL DANN
*Commissioner of Patents and Trademarks*